United States Patent [19]
Levine et al.

[11] 3,877,995

[45] Apr. 15, 1975

[54] POTASSIUM BORATE GLASS COMPOSITIONS

[75] Inventors: Charles A. Levine; Floris Y. Tsang, both of Concord, Calif.

[73] Assignee: The Dow Chemical Company, Midland, Mich.

[22] Filed: Dec. 3, 1973

[21] Appl. No.: 420,984

Related U.S. Application Data

[63] Continuation-in-part of Ser. No. 276,592, July 31, 1972, abandoned.

[52] U.S. Cl. ............ 136/146; 136/6 FS; 106/47 R; 106/54
[51] Int. Cl. .............................................. H01m 3/02
[58] Field of Search ................. 136/6 FS, 153, 146; 106/47 R, 54

[56] References Cited
UNITED STATES PATENTS

| | | | |
|---|---|---|---|
| 3,215,543 | 11/1965 | Bre | 106/47 R |
| 3,310,411 | 3/1967 | Vedder et al. | 106/39 |
| 3,404,035 | 10/1968 | Kammer et al. | 136/6 FS |
| 3,476,602 | 11/1969 | Brown et al. | 136/6 FS |
| 3,481,749 | 12/1969 | Godron | 106/47 R |
| 3,663,294 | 5/1972 | Levine | 136/6 FS |
| 3,679,480 | 7/1972 | Brown et al. | 136/6 FS |

*Primary Examiner*—Winston A. Douglas
*Assistant Examiner*—John F. Niebling
*Attorney, Agent, or Firm*—J. Roger Lochhead

[57] ABSTRACT

An amorphous glass sytem based on potassium borate, which may also contain additives to modify viscosity, expansion coefficient, and the like, has found particular utility as the membrane material in alkali metal-sulfur batteries due to its inertness towards potassium, sulfur and potassium sulfide, as well as its excellent ability to conduct potassium ions.

5 Claims, No Drawings

POTASSIUM BORATE GLASS COMPOSITIONS

This application is a continuation-in-part of my co-pending application Ser. No. 276,592, filed July 31, 1972, and now abandoned entitled "POTASSIUM BORATE GLASS COMPOSITIONS".

BACKGROUND OF THE INVENTION

A significant development in the area of battery cells, particularly secondary battery cells (cells which can be discharged and electrically recharged numerous times without injury to the cell), has been the introduction of alkali metal-sulfur batteries. U.S. Pat. Nos. 3,404,035 and 3,476,602 are examples of this new technology.

This type of cell generally consists of a liquid anode (a melt consisting of one or more alkali metals, alkali metal amalgams, or alkali metal alloys); a liquid or paste sulfur cathode (some of which is melted and in which the cations of the metal are dispersed); and an electrolyte-separator or membrane which is selectively permeable to the cations of the metal and which separates the anode and cathode. This membrane, is further adapted to transmit ions of the anode metal between the anode and cathode compartments without transmitting, to any appreciable extent, electrons, molecules of the anode metal, or ions or molecular species of the cathode. The anode, cathode, and membrane elements are typically positioned within a liquid and vapor tight case. Electrically-conducting leads are attached to the anode and cathode to complete the battery unit.

Typically, these batteries have utilized a liquid sodium anode; a liquid sulfur-sodium sulfide mixture, e.g., a sodium polysulfide, as the cathode; and a sodium ion conductive glass as the membrane. As a cathode, sodium sulfide dissolved in, or in admixture with, sulfur has been discovered to be especially suitable inasmuch as these two components form mixtures that become liquid at relatively low temperatures (a minimum temperature between about 270°–330°C.), and which also exhibit unexpectedly high electrical conductivity over broad ranges of compositions.

We have now discovered that, in a battery cell utilizing a liquid potassium metal anode and liquid sulfur-potassium sulfur mixtures, e.g., potassium polysulfide, as the cathode, a potassium ion-conductive glass membrane is advantageous. Such cells, and their operation, are described in U.S. Pat. No. 3,476,602.

Electrolyte-separators or membranes suitable for use in these types of cells, then, must possess the ability to keep the liquid anode separated from the liquid cathode and they must also be conductive, i.e., they must possess the ability to transmit ions of the anode metal between the anode compartment and the cathode compartment but they sould not, in any substantial way, conduct electrons, the elemental anode metal or the cathode material in either its molecular or ionic form. Furthermore, these membranes should resist degradation during operation, be inert to chemical attack by the liquid components of the cell and, preferably, should have high ionic conductivity.

To secure the greatest efficiency and the highest energy density, the electrolyte-separator is generally utilized in the form of thin membranes fabricated in various geometries and dimensions. Suitable membranes include flat plates, corrugated sheets, spirals, hollow fibers and other shapes designed to provide for ready anode metal ion transfer during battery operation, but which will keep the liquid anode and cathode materials separated.

Glasses and porcelain materials have been utilized by the prior art as such a membrane material. Many silicate systems have been tried, e.g., $K_2O.4 SiO_2$, but have not been proven satisfactory. It has been found that, depending upon the $K_2O$ content, they are not chemically resistant enough to potassium, sulfur or sulfide.

While potassium borates are known (see, for instance, Levin et al., *Phase Diagrams for Ceramists*, Diagram No. 165, p. 87, Am. Ceramic Society (1964) ), there are no reported potassium borate-alkali halide amorphous glass systems.

DESCRIPTION OF THE INVENTION

The present invention provides an amorphous glass system based on potassium borate which may also contain additives to modify viscosity, expansion coefficient and the like.

In one respect, the invention is a glass system which finds particular utility as a separator membrane in an alkali-sulfur battery cell, said glass being a potassium borate which may optionally contain potassium halide and other additives.

In another respect the invention is an amorphous potassium borate/potassium halide glass system which may contain viscosity modifiers and the like.

More particularly, the invention is an amorphous potassium borate glass system of the formula $$K_2O.(2+a)\ B_2O_3.(b-c-e)\ KX.(c/2)M(X')_2.dY.(e/3)M'(X'')_3$$

wherein, in said formula, $-0.5 < a < 2$; $0 < b \leq (1+a/2) + 0.3$, when X is F, or $0 < b \leq (1+a/6) + 0.1$, when X is Cl or Br; $0 \leq C \leq b$; $0 \leq d \leq 1$; $0 \leq e \leq (b-c)$; M is mg, Ca, Sr or Ba; M' is Al or Ga; Y is $SiO_2$ or $1/2\ P_2O_5$; and X, X' and X'' are, independently, Cl, Br or F.

The above glass system has been found to be chemically inert toward potassium, sulfur and potassium sulfide. Further, it demonstrates reasonably high potassium ion conductance. Therefore, this glass finds a specific utility as a separator membrane material for alkali metal-sulfur batteries, particularly when in the form of a fine, hollow fiber. It has also been found that the above glass system is suitable for use as a separator membrane when $b = O$.

For use as the membrane material in an alkali-sulfur battery cell, preferred ranges for those variables in the above formula are as follows:

$0 \leq a \leq 0.2$
$0.01 \leq b \leq 0.5$
$0 \leq c \leq 0.2$
$d$ and $e = O$
$M = Mg$
$X$ and $X' = F$.

A preferred structure for a separator membrane produced from the glass of this invention is one or more very fine, hollow fibers having outside diameter-to-wall thickness ratios of about 3–20 and, desirably, about 4–10. When these ratios are present, hollow fibers having an outside diameter of about 20–1000 microns and a wall thickness of about 5–100 microns are normally employed. Such fibers can provide a high strength, thin-walled membrane which can promote a high ion conductivity and supply a very large surface area-to-volume ratio. Although obviously less advantageous in the latter respect, hollow fibers having an outside diameter of 5000 microns with wall thicknesses of 1000 microns can be employed but the efficiency and energy density of the cell is substantially reduced.

SPECIFIC EMBODIMENTS

Example 1

Stoichiometric amounts of $K_2CO_3$, $B_2O_3$, and KF (as needed to prepare $K_2O.3\ B_2O_3.KF$), in powder form, were weighed out, thoroughly dried and blended together. This mixture was placed in a platinum dish and the dish and its contents heated to 900°C. After the mix had completely melted, it was stirred with a graphite rod, and then poured onto a graphite plate and allowed to cool rapidly. There resulted a clear, transparent glass with a softening point of 418°C.

After 5 months at room temperature, the glass was still clear and transparent, showing little or no tendency to devitrification at room temperature.

Example 2

Stoichiometric amounts of $K_2CO_3$, $B_2O_3$ and KF (as needed to prepare $K_2O.\ 2.14\ B_2O_3.\ 0.5\ KF$), were weighed out, dried, mixed and melted as in Example 1. When this glass was poured out onto a graphite plate, a clear, transparent glass resulted (softening point of 415°-25°C.), although the outer edges did show a tendency to crystal growth. Most of the glass remained transparent and no further devitrification took place over a 5-month period at room temperature.

Example 3

In a manner similar to Examples 1 and 2, the following glasses were made:
$K_2O.2B_2O_3.1/6\ KF$
$K_2O.2B_2O_3.1/6\ KCl$
$K_2O.2B_2O_3.0.4\ KF.0.05\ MgF_2$
$K_2O.2B_2O_3.0.08\ KBr.0.2\ SiO_2$.
The above were all clear glasses.

Example 4

A melt of $K_2O.2B_2O_3.0.3\ KF.0.1\ MgF_2$, prepared as above, was cooled to an appropriate viscosity (about 4 $\times$ 10$^3$ poises at 620°C.) and a hollow fiber was hand-drawn from it by standard glass blowing techniques. The fiber had an outside diameter of about 400$\mu$ and an inside diameter of about 220$\mu$.

A 6-inch section of this fiber was then sealed at one end to form a suitable glass capillary for use in a lab-scale battery.

The battery was made as follows: A 12-inch length of 5 mil aluminum wire was inserted into the open end of the glass capillary and the assembly placed in an inert atmosphere box. The open end of the capillary was then placed in a pool of liquid potassium held at 150°C. The gas from the inside of the capillary was then removed by vacuum, and, when the vacuum was released, liquid potassium filled the capillary. This potassium-filled glass capillary tube, with the aluminum wire emerging from the open end, was then inserted, closed-end down, into a 1 cm. diameter test tube (8 inches long) that contained about 4 gm. of solid $K_2S_4$.

A 10 mil stainless wire was inserted into the test tube alongside the glass capillary, and the two wires were brought out of the test tube through a rubber stopper. The wire from the potassium was the anode lead and the wire from the $k_2S_4$ was the cathode lead. The bottom 4 inches of the test tube was then heated and maintained at 300°C., and a working battery model resulted. (See U.S. Pat. No. 3,476,602 for further details regarding construction of such cells).

Measuring the voltage across the anode and cathode leads gave about 2.13 volts. When this cell was discharged by placing a 100 K resistor across the leads, 18 microamperes of current was drawn. The terminal voltage showed 1.77 volts. Similarly, when the cell was charged by providing 18 microamperes charging current, the terminal voltage was 2.49 volts. Thus, the internal resistance of the cell was about 20 K$\Omega$.

The cell was intermittently charged and discharged, and then held at open circuit. Cell constants remained the same after operating in this manner for 7 weeks.

We claim:

1. An amorphous potassium borate glass system of the formula $K_2O.\ (2+a)\ B_2O_3.\ (b-c-e)\ KX.\ c/2\ M(X')_2.\ dY.\ e/3\ M'\ (X'')_3$ wherein, in the formula, $-0.5 < a < 2$;
$0 < b \leq (1+a/2) + 0.3$, when X is F;
$0 < b \leq (1+a/6) + 0.1$, when X is Cl or Br;
$0 \leq c \leq b$;
$0 \leq d \leq 1$;
$0 \leq e \leq (b-c)$;
M is Mg, Ca, Sr or Ba;
M' is Al or Ga;
Y is $SiO_2$ or ½ $P_2O_5$; and
X, X' and X'' are, independently, Cl, Br or F.

2. The composition of claim 1 wherein, in the formula,
$0 \leq a \leq 0.2$,
$0.01 \leq b \leq 0.5$,
$0 \leq c \leq 0.2$,
$d$ and $e$ are O, M is Mg and X and X' are F.

3. In a battery cell comprising a first oxidizable liquid metal electrode, a second fluid reducible electrode and a substantially fluid tight membrane separating said first and second electrodes, the improvement which comprises a separating membrane fabricated from an amorphous potassium borate glass composition of the formula $K_2O.\ (2+a)\ B_2O_3.\ (b-c-e)\ KX.\ c/2\ M(X')_2.\ dY.\ e/3\ M'(X'')_3$ wherein, in the formula,
$-0.5 < a < 2$;
$0 \leq b \leq (1+a/2) + 0.3$, when X is F;
$0 \leq b \leq (1+a/6) + 0.1$, when X is Cl or Br;
$0 \leq c \leq b$;
$0 \leq b \leq 1$;
$0 \leq e \leq (b-c)$;
M is Mg, Ca, Sr or Ba;
M' is Al or Ga;
Y is $SiO_2$ or ½ $P_2O_5$; and
X, X' and X'' are, independently, Cl, Br or F.

4. The article of claim 3 wherein, in the formula,
$0 \leq a \leq 0.2$,
$0.01 \leq b \leq 0.5$,
$0 \leq c \leq 0.2$,
$d$ and $e$ are O, M is Mg and X and X' are F.

5. The article of claim 3 wherein the separating membrane is in the form of one or more fine hollow fibers having an outside diameter/wall thickness ratio of from about 3 to 20, ranging in outside diameter from about 20 to 1000 microns and a wall thickness of from about 5 to 100 microns.

* * * * *